J. W. FORCE, DEC'D.
C. V. SMITH, ADMINISTRATOR.
TURN BUTTON.
APPLICATION FILED MAY 14, 1914.
1,120,610.
Patented Dec. 8, 1914.
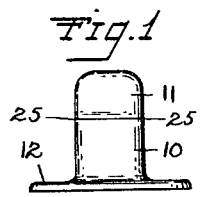
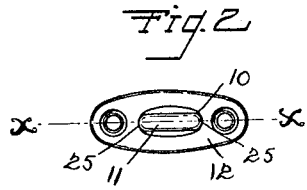
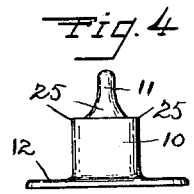
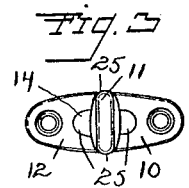
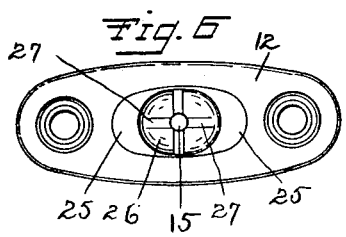
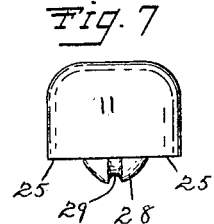
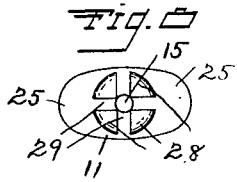

UNITED STATES PATENT OFFICE.

JOHN W. FORCE, OF NEW BRITAIN, CONNECTICUT; CLARENCE V. SMITH ADMINISTRATOR OF SAID FORCE, DECEASED.

TURN-BUTTON.

1,120,610. Specification of Letters Patent. Patented Dec. 8, 1914.

Application filed May 14, 1914. Serial No. 838,524.

*To all whom it may concern:*

Be it known that I, JOHN W. FORCE, a citizen of the United States, residing at New Britain, in the county of Hartford and State of Connecticut, have invented certain new and useful Improvements in Turn-Buttons, of which the following is a specification.

My invention relates to improvements in turn buttons, of the type used for automobile curtains, and the object of my improvement is simplicity and economy in construction and convenience and efficiency in use.

In the accompanying drawing, Figure 1 is a side elevation of my improved turn button. Fig. 2 is a plan view of the same. Fig. 3 is a similar view of the same, with the head turned 90 degrees from the position shown in Fig. 2. Fig. 4 is a side elevation of the same. Fig. 5 is a sectional view on an enlarged scale on the line $x\ x$ of Fig. 2. Fig. 6 is a plan view of the base. Fig. 7 is a side elevation of the head. Fig. 8 is a bottom view of the same.

My improved turn button comprises a base 10 on which is rotatively mounted the head 11. The base 10 comprises a shell-like structure having an oval formation for the body portion, provided at the lower end with a flanged base portion 12 and closed at the upper end by a platform 14, which latter has a hole 15 for the pivotal pin 16. The pivotal pin 16 is connected at the upper end to the head 11, extends downwardly through the hole 15, has the lower end 21 headed, and has mounted on its body portion a washer 22 resting on the headed lower end 21 and a spring 23, whereby the head 11 is operatively held in resilient engagement with the base 10.

Locking means are provided for locking the head 11 relatively to the base 10 in one or the other of the alternative positions to which it may be set, and shown in Figs. 2 and 3 of the drawings, in the following manner: The bottom portion of the head 10 is of the same size and shape as the platform 14, both being oval, and they each comprise a central portion, surrounding the hole 15 and the pin 16, which are always in engagement or in opposition, and end portions 25, one on each side of the central portion, and which are in engagement in one position, as shown in Fig. 2, the one covering the other, and which are disengaged and uncovered in the other position, as shown in Fig. 3, and exposed, the end portions of the head 11 overhanging the lateral wall of the base 10. The central portion 26 of the base 10 is dished to provide a concavity of hemi-spherical form, extending appreciably downwardly below the platform 14, and on the face of the wall of the said concavity 26 there is a plurality of upwardly extending ribs 27, having a rounded or V shaped cross-section. The central portion of the head 11 is formed as the counterpart of the construction described, comprising downward extension 28 of the body portion of hemi-spherical form and which is provided with a plurality of grooves 29 corresponding in number to the ribs 27 and of suitable form to receive and house the same. As shown there are four ribs 27 and grooves 29, arranged in pairs in diametral planes, the plane of one pair being at right angles to the plane of the other. The ribs and grooves when engaged serve to lock the head 11 relatively to the base 10 in one or the other of the alternative positions, the one being at right angles to the other. The depressed portion or concavity 26 is made of slightly smaller diameter than the width of the base 10, so that a face to face contact of the platform 14 and the head is always insured when in either position in use, thus preventing the admission of moisture to the interior of the base and to the spring.

The provision of a plurality of locking members, or a number greater than the usual pair as ordinarily found in devices of the kind described insures a superior and more positive locking of the parts and the curved outline of the locking members serves to insure the engagement of the same in proper manner when moved from one of the positions of engagement, avoiding becoming set at a position intermediate to one of the locking positions. Furthermore, owing to the close joint of the platform and head the outside finish to the button and head, which in some cases consists of a spraying with japan, may be applied to the same with the parts completely assembled and in condition for use. The provision of four ribs as shown also insures a longer life of the parts in use. Furthermore, the dished portion 26 of the base 10 and the downward extension 28 of the head 11 serve as coöperating positioning members for positioning the head 11 on the platform 14 of the base 10, as will be noted from the sectional view shown in Fig. 5, so as to effect a locking of the same against relative sliding movement.

What I claim as my invention is:—

A turn button comprising a base member and a head member pivotally and resiliently mounted thereon, and locking means therefor, and the said locking means comprising a depressed portion on one of the said members and an extension on the other of the said members fitting the said depressed portion, and a set of coöperating ribs and grooves on the said depressed portion and extension.

JOHN W. FORCE.

Witnesses:
 LOREN D. PENFIELD,
 WARREN W. MARSHALL.

Copies of this patent may be obtained for five cents each, by addressing the "Commissioner of Patents, Washington, D. C."